Dec. 26, 1967 C. D. HUFFMAN ETAL 3,360,097

BREAD COOLING APPARATUS

Original Filed March 20, 1964 11 Sheets-Sheet 1

INVENTOR.
Clayton D. Huffman
Robert W. Hartung

Otto A. Earl
ATTORNEY.

BREAD COOLING APPARATUS

Original Filed March 20, 1964

11 Sheets-Sheet 2

INVENTOR.
Clayton D. Huffman
Robert W. Hartung

Peter Q. Earl
ATTORNEY.

Dec. 26, 1967 C. D. HUFFMAN ETAL 3,360,097

BREAD COOLING APPARATUS

Original Filed March 20, 1964 11 Sheets-Sheet 3

INVENTOR.
Clayton D. Huffman
Robert W. Hartung

[signature]
ATTORNEY.

Dec. 26, 1967 C. D. HUFFMAN ET AL 3,360,097

BREAD COOLING APPARATUS

Original Filed March 20, 1964 11 Sheets-Sheet 4

INVENTOR.
Clayton D. Huffman
Robert W. Hartung

Otto A. Earl
ATTORNEY.

INVENTOR.
Clayton D. Huffman
Robert W. Hartung
Otto A. Earl
ATTORNEY.

BREAD COOLING APPARATUS

Original Filed March 20, 1964

INVENTORS
Clayton D. Huffman
Robert W. Hartung
[signature]
ATTORNEY.

INVENTOR.
Clayton D. Huffman
Robert W. Hartung

Otto A. Earl
ATTORNEY

BREAD COOLING APPARATUS

Original Filed March 20, 1964 11 Sheets-Sheet 8

INVENTOR.
Clayton D. Huffman
Robert W. Hartung
BY [signature]
ATTORNEY

BREAD COOLING APPARATUS

Original Filed March 20, 1964

INVENTOR.
Clayton D. Huffman
BY Robert W. Hartung
[signature]
ATTORNEY.

INVENTOR.
Clayton D. Huffman
BY Robert W. Hartung
[signature]
ATTORNEY.

BREAD COOLING APPARATUS

Original Filed March 20, 1964 11 Sheets-Sheet 11

INVENTOR.
Clayton D. Huffman
Robert W Hartung

BY

ATTORNEY.

United States Patent Office 3,360,097
Patented Dec. 26, 1967

3,360,097
BREAD COOLING APPARATUS

Clayton D. Huffman, Albion, and Robert W. Hartung, Clarence Township, Calhoun County, Mich., assignors to Union Steel Products Company, Albion, Mich.

Original application Mar. 20, 1964, Ser. No. 353,463, now Patent No. 3,240,316, dated Mar. 15, 1966. Divided and this application Feb. 9, 1966, Ser. No. 538,884
6 Claims. (Cl. 198—20)

ABSTRACT OF THE DISCLOSURE

A conveyor construction, particularly for cooling loaves of bread, having an endless chain arranged to move through a path having at least one horizontally elongated, vertically spiralled reach located between a loading reach of the conveyor and an unloading reach of the conveyor. The endless chain is supported upon interior rail means as it travels through the spiralled reach. A plurality of pallets are connected along corresponding inner side edges thereof to the chain and project outwardly therefrom so that the pallets are moved by the chain through the path. The pallets having a rigid, foraminous, generally planar, horizontal, upper surface on which objects, such as loaves of bread, can be supported in spaced side-by-side relation so that the objects can be exposed to the ambient atmosphere on all sides thereof. The outer sides of the pallets are supported by exterior rail means and driving idler sprockets are provided for moving and guiding the chain through the path.

This application is a division of my copending application Ser. No. 353,463, filed Mar. 20, 1964.

This invention relates to improvements in bread cooling apparatus. The principal objects of this invention are:

First, to provide a bread cooling apparatus for cooling loaves of freshly baked bread which apparatus has a high capacity and occupies a minimum of space.

Second, to provide bread cooling apparatus which transports loaves of freshly baked bread on individual pallets without movement of the bread relative to the pallets so that there is no abrading of the freshly baked bread or creation of crumbs in the cooler.

Third, to provide a novel form of conveyor in which a single continuous driven chain advances successive flat open wire pallets through a spiral path to effect cooling of bread on the pallets and passes by one or more bread unloading positions and a bread load position at which bread may be removed from and added to the pallets respectively while the conveyor is in continuous motion and without damage to the bread during the transfer operation.

Fourth, to provide a novel form of bread cooling conveyor in which a single chain advances separate pallets capable of supporting several loaves of bread through one or more vertical spiral paths with the load on the conveyor chain equally distributed along the several reaches of the chain and the conveyor.

Fifth, to provide a bread cooling conveyor which advances plural loaves of bread in accurately spaced relation on separate pallets so that maximum use of the space occupied by the conveyor is utilized while permitting necessary air circulation around the loaves of bread.

Sixth, to provide a bread cooling apparatus which is adjustable as to speed and cooling time and which has a novel loading mechanism for synchronizing and assuring smooth transfer of bread from an oven to the cooler and from the cooler in synchronized relation to movement of the cooler at all adjusted speeds of the cooler and while the cooler is coasting to a stop.

Seventh, to provide a novel form of transfer mechanism which will collect the spaced groups of loaves of bread as they are depanned from an oven into a continuous side by side succession of loaves to assure adequate supply of bread and thereafter separate successive individual loaves into accurately spaced relation and transfer the spaced loaves in side by side pallet load groups onto the pallets of the cooling conveyor without injury to the loaves.

Eighth, to provide a bread cooling conveyor with a variable speed drive with bread loading and bread unloading mechanisms which are synchronized with the speed of the cooling conveyor and the drive to the cooling conveyor so that there is no danger of damage to the loaves during the loading or unloading operations.

Ninth, to provide a first form of pallet unloading mechanism which can be connected to operate in accordance with demand of a slicing machine positioned to receive the bread delivered from the cooler.

Tenth, to provide a modified form of cooler unloading mechanism adapted to discharge each successive pallet of the cooling conveyor onto an off-feeding conveyor for delivery to a slicing or wrapping machine.

Other objects and advantages of the invention will be apparent from a consideration of the following description and claims. The drawings, of which there are ten sheets, illustrate one practical arrangement of the bread cooler of the invention associated with the delivery conveyor from an oven and supply conveyors to two slicing or wrapping machines.

FIG. 17 is a schematic wiring diagram showing the controls and energizing connections for the several elements of the cooling conveyor and its loading and unloading elements.

Figure 1:
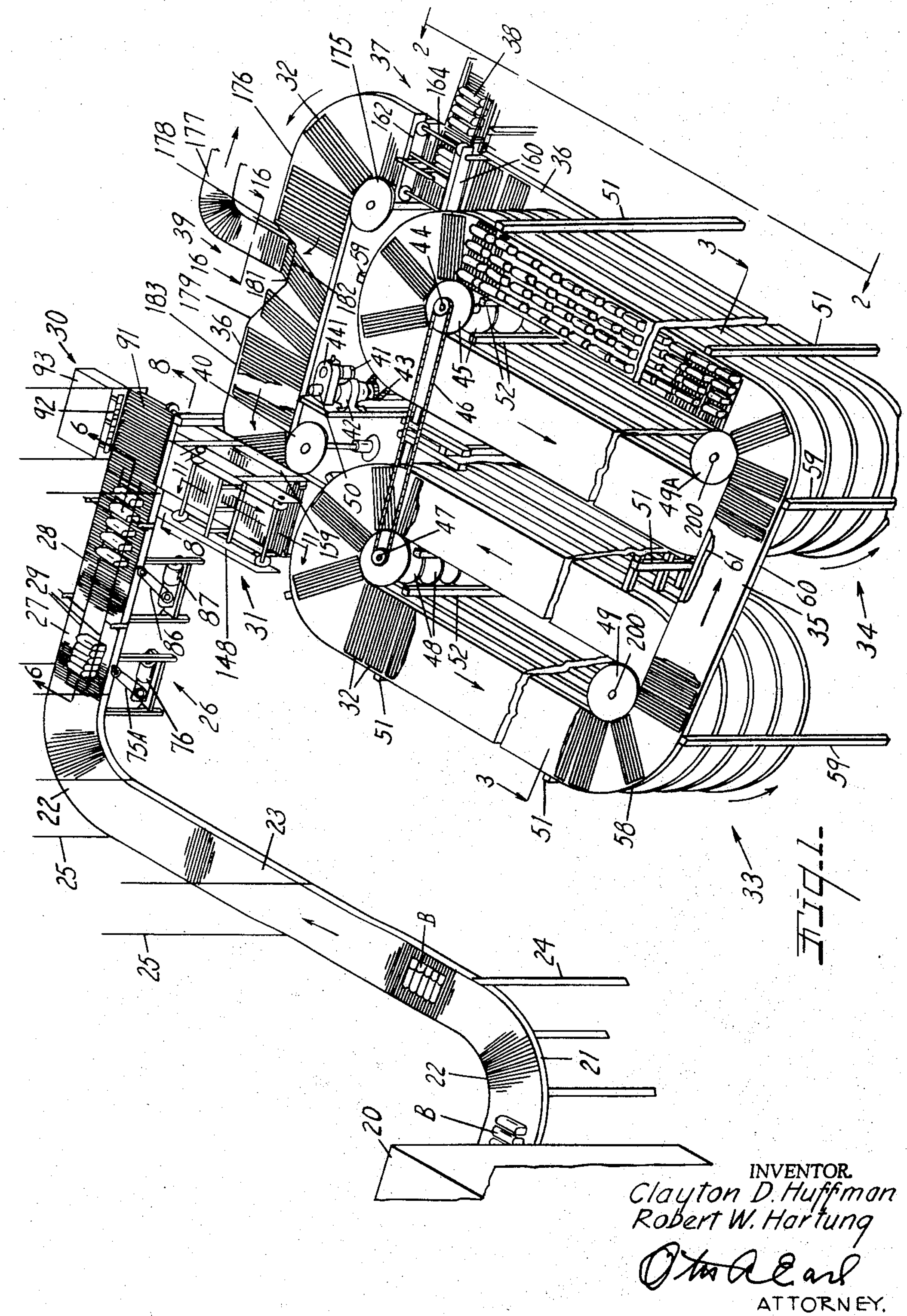
FIG. 1 is a fragmentary perspective view of an assembled cooler with associated delivery connections from an oven and off-feeding supply connections to slicing or wrapping machines. Parts of the cooler and the associated equipment are broken away and illustrated conventionally.

The general arrangement of the bread cooler shown in FIG. 1 is designed for mass production of bread and includes a source such as a depanner indicated conventionally at 20 for receiving pans of baked bread from a continuously operating oven and delivering the bread in spaced groups such as B to a delivery conveyor 21. The conveyor 21 may be of such length and configuration as is necessary to advance the groups of loaves B from the depanner to the location of the cooler. The cooler is shown on the same level or floor as the depanner 20 but it will be appreciated that the delivery conveyor 21 may extend upwardly or downwardly if it is necessary to position the depanner on a different floor than the cooler. The delivery conveyor includes curved sections 22 and straight sections 23 which may be supported either by legs 24 from the floor or suspended from the ceiling by hangers 25. The delivery conveyor delivers the spaced groups of loaves B to a collecting and spacing conveyor assembly indicated generally at 26. The collecting and spacing conveyor includes a first collecting section 27 which will be described in greater detail presently and which operates continuously with the delivery conveyor 21 (see FIG. 6). The section 27 delivers to second section 28 that operates intermittently and at a slower speed than the collecting section 27 so that preceding groups of loaves B are slowed down permitting following groups to catch up and position all loaves in side by side contacting relation. It will be noted that the loaves are positioned transversely of the conveyor and advanced in column or single file, side by side relation. The collecting section 28 delivers to a spacing conveyor 28A which will also be described in greater detail and which operates at a faster rate of speed than the collecting conveyor to create a uniform spacing between the individual loaves. Side guides 29 positioned over the spacing conveyor guide the loaves centrally to a loaf transfer mechanism indicated generally at 30.

The transfer mechanism delivers a group of loaves to a cooler loading conveyor indicated generally at 31 and the loading conveyor operates in a manner to be described to load each group of loaves onto an individual wire pallet 32 on the cooling conveyor.

The cooling conveyor consists of a multiplicity of the individual wire pallets 32 connected to a single conveyor chain with the chain and pallets supported in a manner to be described to advance the pallets in one or more banks of coolers two of which are indicated generally at 33 and 34. Each pallet receives a group of loaves G and in the example illustrated the group consists of four individual loaves L positioned in side by side spaced relation on the pallet. It is an important feature of the invention that the loaves are accurately spaced about ¾ of an inch apart for maximum use of space and adequate cooling by natural air convection. The first bank 33 of the cooler is loaded at the bottom and advances upwardly in a spiral to the cross-over 35 to the second bank 34. The second bank of the cooler advances spirally downwardly to an outlet section 36 which has a first form of unloader indicated generally at 37 associated therewith. It should be appreciated that plural unloaders 37 may be provided and controlled as will be described to off-load groups of loaves G from selected pallets to a forwarding conveyor 38 for delivery to a slicing or wrapping machine. Following the unloader 37 the conveyor of the cooler and the pallets thereof is extended to a second modified form of unloader indicated generally at 39. The unloader 39 is designed to operate on every succeeding pallet and may be utilized to remove any bread left on the cooling conveyor by reason of selective operation or shut down of preceding unloaders 37. After passing the final unloader 39, the delivery reach 36 of the cooling conveyor is advanced around a horizontal right angle curve guided by the idler sprocket 40 to underneath the loading conveyor 31 which then loads succeeding groups of loaves onto the empty pallets of the cooling conveyor.

The cooling conveyor is powered by a motor 41 connected through a mechanical speed adjusting mechanism 441 to a speed reduction gear box 42 to a drive chain 43 which drives the lower end of a drive shaft 44 associated with the second bank 34 of the cooler. The shaft 44 has plural drive sprockets 45 thereon which will be described in greater detail and which drive the several levels of the bank 34. The shaft 44 projects above the upper sprocket 45 to a cross chain 46 which drives the upper end of a drive shaft 47 for the first bank 33 of the cooler. (See FIGS. 1 and 2). The shaft 47 also has plural drive sprockets 48 which drive the several tiers or levels of the bank 33 of the cooler. Each bank 33 and 34 has a plurality of coaxially arranged idler sprockets 49, the mounting of which will be described in greater detail presently for directing and supporting the chain of the conveyor.

The speed change mechanism 441 driven by the primary drive motor 41 also drives an alternator 50, the purpose of which is to control the speed of operation of the loading apparatus 31 as will be described in greater detail presently. It will be appreciated that the cooler proper must be sized to take the full output of the oven and depanner at the slowest speed and longest desired cooling time. The variable speed mechanism 441 permits speeding up the cooler conveyor when shorter cooling times are desired. It is also necessary that the conveyor loader 31 operates in accurately controlled timed relation with the speed of advance of the cooler conveyor and the alternator 50 is used to automatically obtain synchronization of the speed of the loader as the speed of the cooler conveyor is adjusted to vary the cooling time cycle of the conveyor by changing its speed.

*Cooling conveyor banks*

The banks of the cooling conveyor are sized, positioned and spaced according to the demands of the user and the space available in the user's plant. The arrangement in FIG. 1 is only one of an infinite number of possible arrangements and is not the same in all details as the examples of the banks shown in other figures. The arrangement shown in FIG. 1 is illustrated in greatly simplified form to show in one view a desired relation of the drive and loading and unloading accessories to the cooling bank, or banks. While two cooling banks 33 and 34 are illustrated, one longer and/or higher bank could connect with a delivery reach 36 at a different level.

As appears most clearly from FIGURES 2–5, the banks of the cooling conveyor are supported by suitable outer uprights or posts 51 and inner uprights or posts 52 which may be supported from the floor as shown or suspended from the ceiling. Each bank has several tiers, FIG. 1 showing five tiers and FIGS. 2–5 showing space for additional tiers. Each tier includes inner straight horizontal side bars 53 and straight outer horizontal side bars 54 of angled section which rigidly connect the posts 51 and 52 along one side of the banks. On the other side of each bank, the posts are connected by straight inclined side bars 55 on the outside and straight inclined side bars 56 on the inside. The ends of interior runs of the tiers, that is all except the infeed and outfeed ends, are connected by semi-circular bars or plates 57. Thus each semi-circular plate connects the end of one horizontal bar with the end of an opposite inclined bar around the outer periphery of the curved ends. The inner straight bars 53 and 56 terminate inwardly of the centers of the curved ends of each bank closely adjacent the peripheries of sprockets 45 and 49.

Where the cooling conveyor passes between two banks there is a 90° curved outer plate 58 (or less than 90° if the banks are not parallel) extending to an end post 59. A straight outer cross-over bar 60 connects the ends of the shorter curved bars. (See FIGS. 1, 2 and 4). A shorter straight inner cross-over bar 61 supported by bars 62 projecting from the top brackets 198 supports the inner side of the conveyor between top idler sprockets 49 and 49A. The outer bars 54 and 55 are of angled section and have inwardly offset flanges carrying anti-friction nylon covers 63. (See FIG. 3A). The inner bars 53 and 56 are of like but reversely faced cross section and support nylon rails 64. The inner bars in addition carry spacer pins 65 that support guide tracks 66 with nylon rails 67 on their upper edges. The rails 64 and 67 are spaced to receive the conveyor chain 68 therebetween and to engage and support the projecting edges of special links 69 to be described in greater detail.

Figure 2:
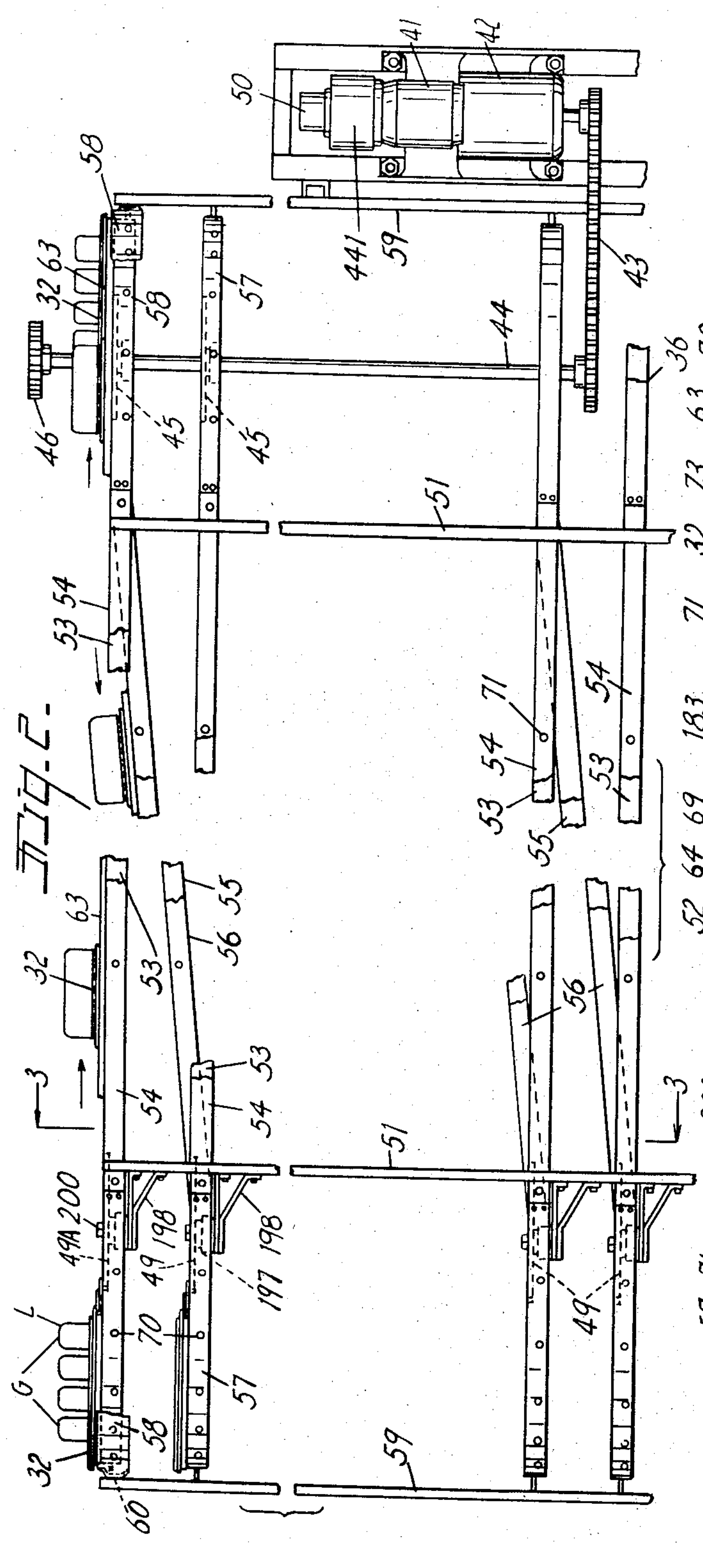
FIG. 2 is a fragmentary side elevational view of one bank of the cooling conveyor and the main drive connections to the conveyor system, parts being omitted and broken away.
Figure 3A:
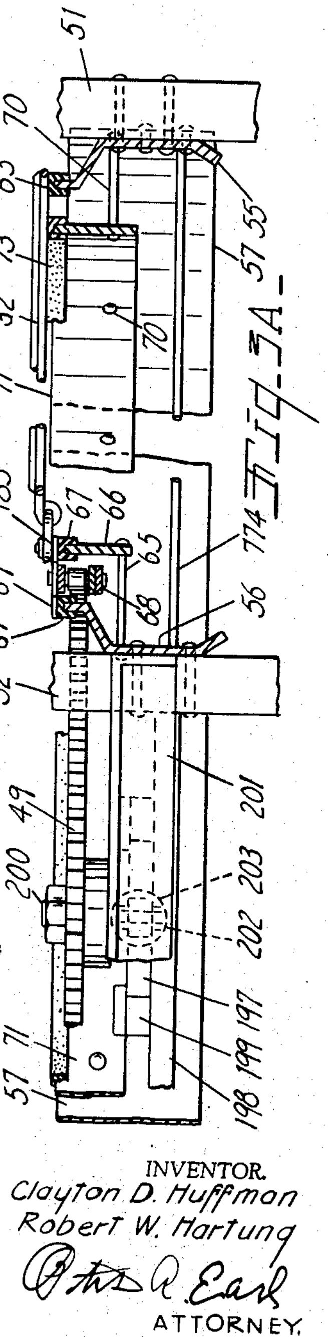
FIG. 3A is an enlarged fragmentary cross sectional view taken along the plane of the line 3A—3A in FIG. 4 showing details which are omitted or appear only conventionally in FIG. 3.
Figure 3:
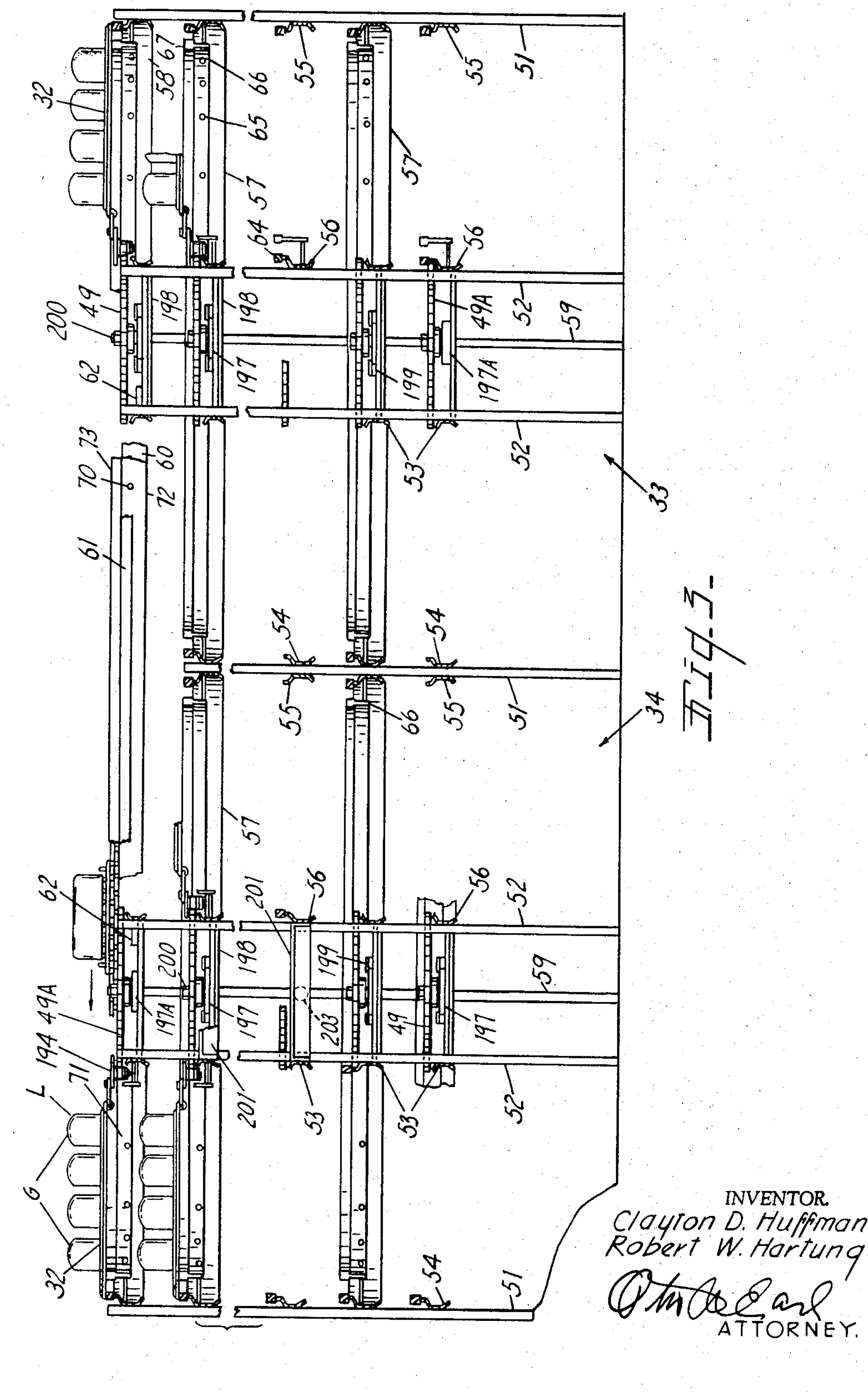
FIG. 3 is a fragmentary vertical cross sectional view taken along the plane of the line 3—3 in FIG. 2 illustrating the idler end of the cooling conveyor tiers, again parts being omitted.
Figure 4:
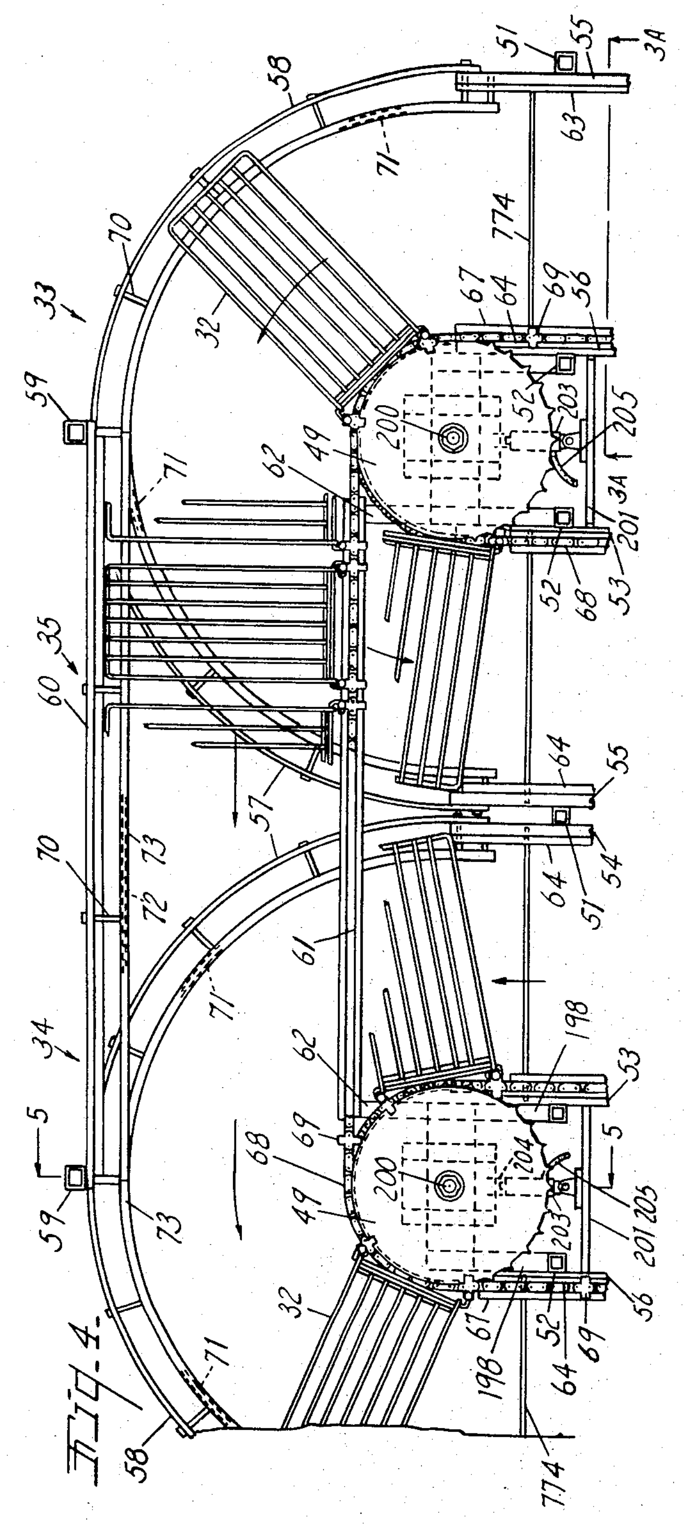
FIG. 4 is a fragmentary top plan view of the structure shown in FIG. 3.
Figures 5, 7:
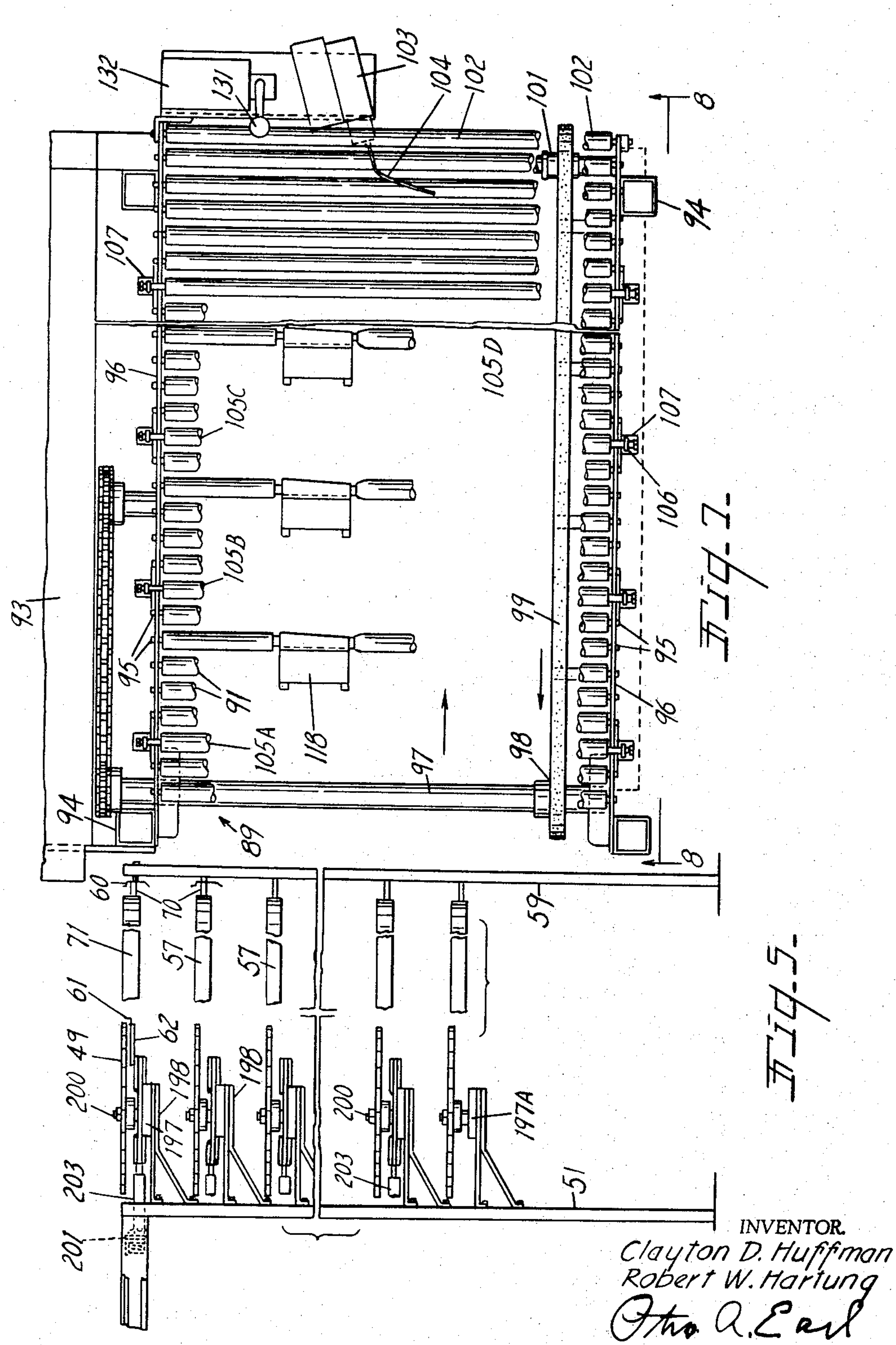
FIG. 5 is a fragmentary side elevational view of the idling end of the cooling conveyor illustrated in FIGS. 3 and 4 with parts omitted and broken away.
FIG. 7 is a fragmentary top plan view of the first portion of the bread transferring mechanism.

At the ends of the banks 33 and 34, the chain 68 passes around and is supported by the sprockets 45 and 49. The semi-circular plates 57, 90° curve plates 58 and cross-over bar 60 carry inwardly projecting pins 70 that support correspondingly curved plates 71 and transfer plate 72 with outer nylon covers 73 on their upper edges to slidably support the outer ends of the pallets 32 around the curved portions of the tiers and banks. In the example illustrated, the conveyor and the pallets advanced therewith advance along horizontal reaches in the inside of the first bank 33 and around the drive sprockets 45 to upwardly inclined reaches on the outside of the first bank 33 and idler sprockets 49 until reaching the top of bank 33 and the transfer or cross-over 35. From there the pallets advance along horizontal reaches 53–54 in bank 34 to the drive sprockets 45 thereof and then along downwardly inclined reaches 55–56 to the idler sprockets and back until reaching the level of outlet section 36. It should be noted that the incline of the inclined reaches as appears in FIG. 2 is exaggerated and actually is very slight. The incline varies with the length of the straight reaches and is only enough to provide the necessary vertical clearance between tiers to clear the height of loaves of bread on the pallets 32. The side bars of the reaches are spaced by spacer bars 774.

*Collecting and grouping conveyor*

Figure 6:
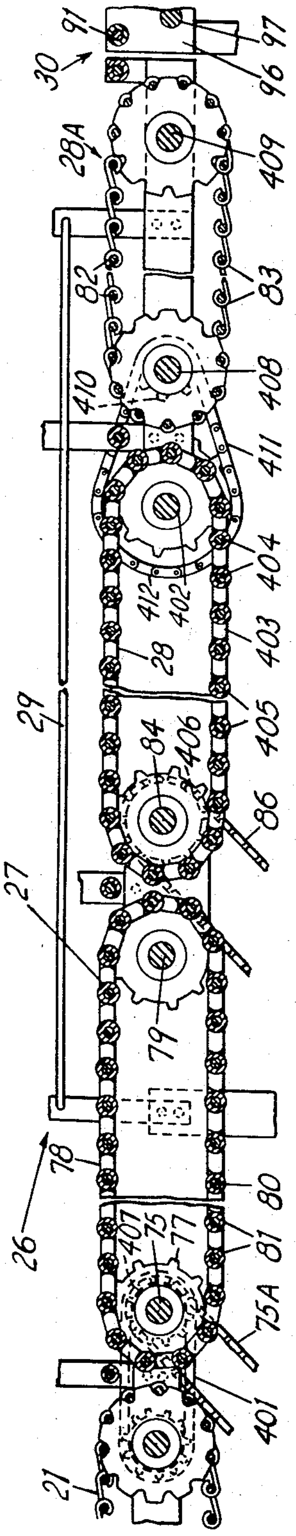
FIG. 6 is a fragmentary vertical longitudinal cross sectional view through the bread collecting and spacing conveyors which establish the proper spacing between the loaves of freshly baked bread for subsequent transfer to the cooling conveyor.

The structure and drive of the collecting conveyor 27, 28 and spacing conveyor 28A is shown in FIGS. 1 and 6. The collecting conveyor consists of a driven shaft 75 driven by the chain 75A from a motor 76 (see FIG. 1). Sprockets 77 drive chain loops 78 around an idler shaft

79 and the chain loops carry cross pins or bearing bars 80 on which the sleeves or rollers 81 are freely rotatable. The chains 78 are driven at the same speed as the delivery conveyor 21 and may drive the adjacent section of conveyor 21 through chain 401 (see FIG. 6). The rotatable character of the sleeves 81 permits section 27 to continue to operate while a loaf at the outlet end thereof is stopped as will now be described.

The first section 27 of the collecting and grouping conveyor assembly delivers to the second section 28 (FIG. 6) of the collecting conveyor that operates intermittently. Section 28 is driven by the chain 86 from motor 87 (FIG. 1). The chain 86 drives shaft 84 and also drives shaft 402 through chain loops 403. The chain loops 403 carry the cross pins or bearing bars 404 of the section 28 of the collecting conveyor. Rollers or sleeves 405 on the pins permit loaves to enter upon the section while it is stopped intermittently as will be described. The section 28 is made long enough to take care of or receive the normal output of the depanner while the collector section 28 is stopped but in the event a group of loaves reaches the end of section 27 while section 28 is stopped, the free rolling character of rollers 81 and 405 permits over-run of section 27 without damage to the leading loaves. The speed of section 28, as is indicated by the relatively large size of sprocket 406 as compared to drive sprocket 407 that drives shaft 75, is less than the speed of section 27 and infeeding conveyor 21 so that the batch loads B delivered in spaced relation from the depanner catch up with each other on the driven free roller section 28 to form a continuous single column of side by side loaves. The slow speed and intermittent operation of section 28 cooperate with the powered, free roller nature of sections 27 and 28 to permit this accumulation without damage to the freshly baked, hot loaves and the section 28 is assured of a substantially continuous supply of loaves at its leading or outlet end, assuming continuous regular output by the depanner.

The first section 28 delivers to a second or spacing section 28A of the collecting and grouping conveyor. Section 28A is a wire link belt having cross wires 82 connected by loops 83. The belt is trained over sprockets on shafts 408 and 409 and is driven from shaft 408 by a sprocket 410 and chain 411 from a sprocket 412 on shaft 402. Sprocket 410 is smaller than sprocket 412 on shaft 402 so the wire link belt moves faster than conveyor section 28 and picks up each loaf from section 28 and moves it away about 2½ times faster than the loaves remaining on section 28 and rollers 404, thus creating a uniform spacing between the adjacent loaves.

The spacing conveyor section 28A delivers to the infeed conveyor 89 of the transfer mechanism 30. The conveyor 89 of the transfer mechanism is driven at the same speed as spacing conveyor section 28A and belt 83 by a separate motor 90 (see FIG. 8) so the equal spacing between loaves is maintained. The conveyor 89 is made up of rollers 91 which rotate on their axes but are fixed as will be described. The conveyors 28 and 28A operate intermittently and simultaneously as will be shown and explained, more particularly in connection with the wiring diagram, presently. For the time being it is sufficient to note that they deliver spaced loaves sidewase to the transfer mechanism 30.

*Transfer mechanism*

FIGURES 1, 7, 8, 9 and 10 show the transfer mechanism to consist of the previously described conveyor 89 and a transverse pusher 92 extensible from a housing 93 to push a pallet load of loaves endwise from the conveyor 89 to the loading conveyor 31. Suitable frame members 94 support the transfer mechanism and the motor 90. The transfer illustrated accommodates four loaves but this could obviously be increased or decreased.

The rollers 91 are mounted on axles 95 supported in side members 96. A drive shaft 97 journaled in the side members is driven by the motor 90 and drives a pulley 98 and belt 99. The belt is trained around an idler pulley 100 on the shaft 101 so that the upper reach of the belt engages and drives the rollers 91 in loaf forwarding direction. An elevated stop bar or roll 102 at the forward or right end of the conveyor stops the leading loaf of each group transferred. A limit switch 103 having a feeler 104 is engaged by the leading loaf and actuated as will be described to signal the arrival of the first loaf.

Spaced along the conveyor 89 and between adjacent rollers 91 are four reciprocable rollers 105 (A, B, C and D). The rollers 105 are carried by lift frames having side bars 106 slidable in guides 107 on the side members 96. Cross bars 108 on the lower sides of the frames are connected to and reciprocated by air cylinders 109 (A, B, C and D). When lowered the rollers 105 are driven by the belt 99. When raised as is shown by the position of roller 105D, the rollers form transverse stops separating one loaf from another on the conveyor 89. The air cylinders 109 are actuated by solenoid operated valves 110 (A, B, C and D) mounted in a bank on the lower part of the framework 94 and having individual actuating solenoids 111 (A, B, C and D). The valves are supplied from a suitable air pump and when deactivated vent their associated cylinders through a muffler 112. A box containing wiring connections to the solenoid coils is indicated at 113. The cylinders 109 are mounted on an angle bar 114 and are connected to their associated valve by conduits 115.

Upright 116 projecting upwardly below the rollers 91 carry trip or limit switches 117 (A, B and C). The switches have activating plungers or shoes 118 which project above and curl over rollers 91 spaced forwardly or to the right in FIG. 8 from their associated spacer rollers 105 to be engaged and depressed by loaves of bread forwarded thereover by the rollers 91 and 105. The limit switches 117 are connected to the solenoid coils 111 as will be described in connection with the circuit diagram. For the present it is sufficient to note that the limit switches and valves operate successively to raise first roller 105D and the C, B and A as four loaves are advanced onto and by the rollers 91.

The pusher 92 has four plates 119 positioned to advance between the spacer rollers 105 and push loaves endwise therealong. As appears most particularly in FIGS. 9 and 10, the pusher 92 is carried by the piston rod 120 of an air cylinder 121 mounted on a plate 122. The plate (and the housing 93 which is omitted from these views) is supported by brackets 123 from the back side of the conveyor 89. Guide rods 124 and 125 connected to the ends of the pusher 92 slide in guides 126. The rod 124 has a tappet 127 actuating limit switches 128 and 129 while pusher 92 carries a tappet 130 actuating the roller 131 of a switch 132 positioned at the right end of the conveyor 89. The switches function in conjunction with other controls to activate solenoid coils 133 and 134 on a double acting valve 135 which in turn actuates the cylinder 121 through pneumatic connections 136 to extend the pusher when the prescribed load of loaves are on the conveyor 89 and push the loaves endwise onto the loading conveyor 31, and immediately retract to permit entry of a succeeding group or load onto the transfer conveyor 89. Air is supplied to the valve from a pump or compressor through conduit 137.

*Loading conveyor*

Figure 11:
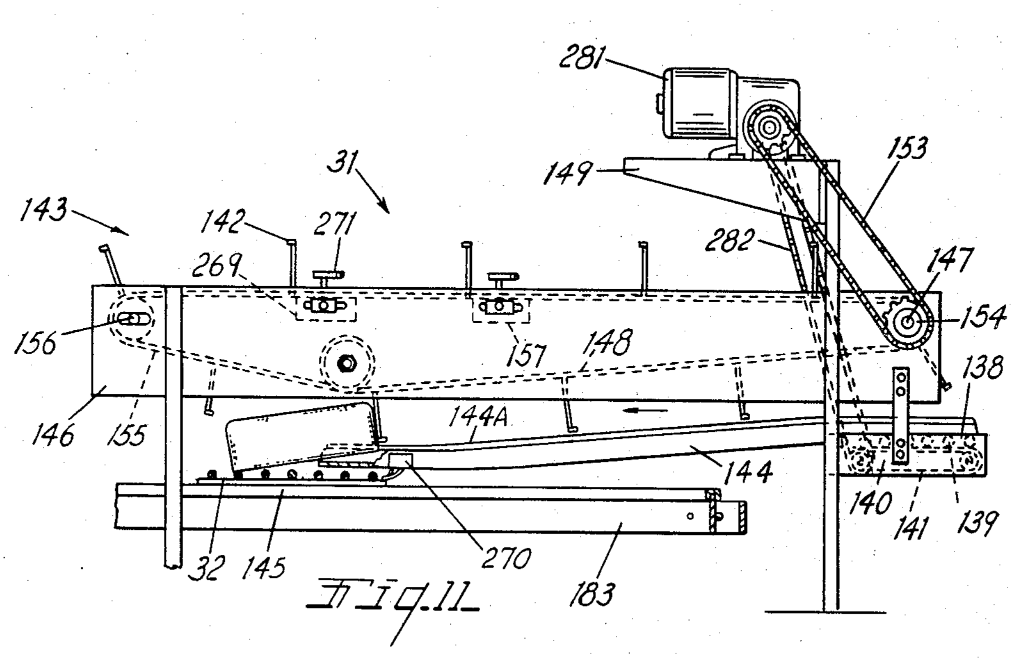
FIG. 11 is a fragmentary side elevational view of the cooling conveyor loading mechanism with parts broken away to illustrate details of operation.
Figure 12:
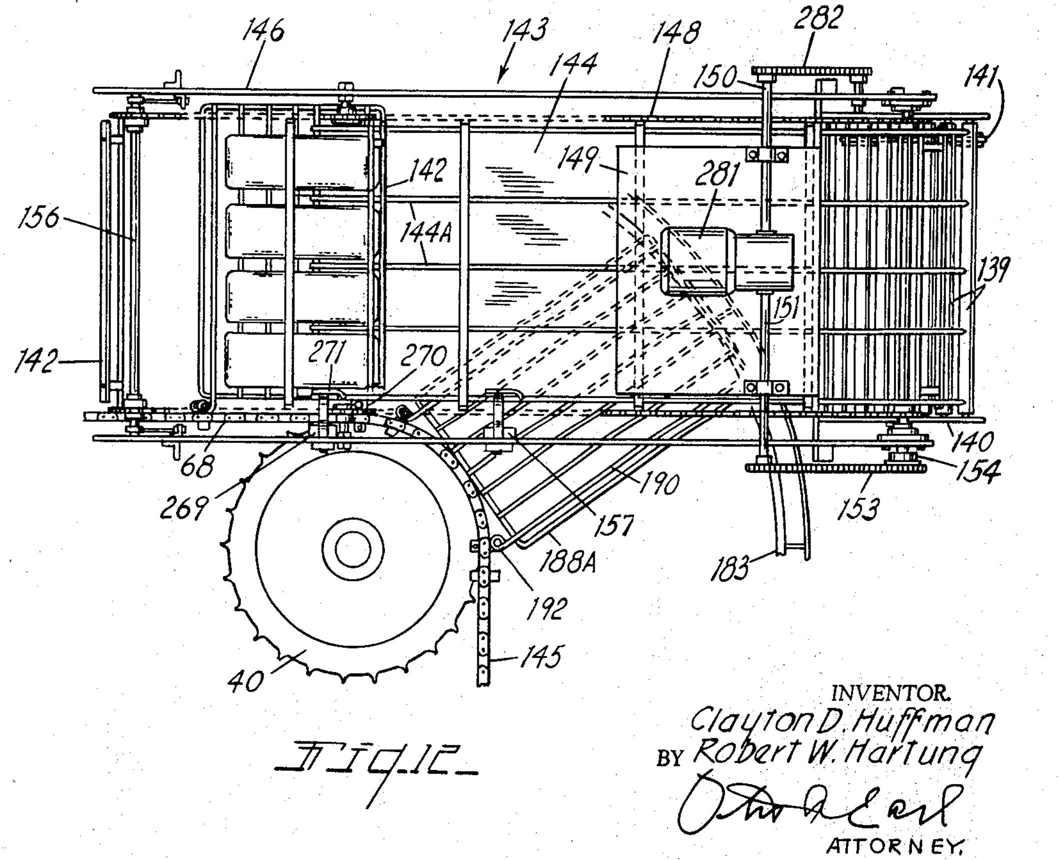
FIG. 12 is a plan view of the pallet loader with a portion of the cooling conveyer positioned to receive bread from the loading conveyor shown in FIG. 11.

The loading conveyor 31 is shown in detail in FIG. 11. Loaves transferred from the conveyor 89 by the pusher 92 are deposited on and received by a forwarding conveyor way having a driven roll conveyor 138. Rolls 139 supported by the side plates 140 and driven by a belt 141 from motor 281 and chain 282 assure carrying away each group of loaves from the transfer conveyor and transporting the group into the path of pusher flights or bars 142 of an overhead loading conveyor 143. The conveyor 143 advances the groups of loaves along a slide plate 144 that projects over the receiving reach of the first tier of the first bank 33 of the cooling conveyor. The receiving reach 145 advances around the horizontal idler sprocket 40 to advance a pallet 32 closely underneath the slide plate 144. Since the cooling conveyor operates continuously and the transfer pusher 92 operates intermittently, it is necessary to absolutely synchronize delivery of loaves from the conveyors 138–143 to be sure that a pallet is in position to receive the loaves. This is accomplished by synchronizing the overhead conveyor as will be described. Guide or spacer rails 144A carried by the plate 144 and projecting over the rollers 139 of conveyor 138 maintain the accurate lateral spacing between the loaves established by the right angle transfer 30. While FIG. 12 shows the pallets 32 as larger than the group of loaves thereon, this is to more clearly illustrate the position of the pallet. Normally the pallets will be sized to more closely conform to the size of the group of loaves.

Conveyor 143 is mounted on side plates 146 supported over both the loading conveyor 138 and the receiving reach 145. A drive shaft 147 drives chains 148 carrying the pusher flight bars 142 spaced far enough apart to receive the longest loaf of bread to be cooled therebetween. The motor 281 and suitable gear box mounted on the stand 149 above the overhead conveyor has one shaft 150 driving the previously described chain 282. Another shaft 151 is connected by the chain 153 and an electrically actuated clutch indicated conventionally at 154 to shaft 147. The lower, loaf forwarding reach of the conveyor is inclined upwardly at 155 so the pusher flights clear the loaves as the flights accelerate in swinging around the idler shaft 156. The clutch 154 is controlled electrically by limit switches 269 and 270. Switch 270 is mounted on the side of the slide plate 144 in the path of the control pins 174 on the cooler conveyor chain, or other parts of each pallet 32 moving into registry with the end of loader slide 144. As will appear more clearly in connection with the circuit diagram in FIG. 17, switch 270 energizes or engages the clutch 154 to connect the continuously operating motor 281 and chain 153 to shaft 147. The position or extent of engagement of switch 270 by each pallet 32 may be adjusted slightly so that the loaves are pushed off the slide onto each pallet in the desired position transversely of the pallet and longitudinally of the loaves. The motor 281 is energized and driven from the alternator 50 driven by the cooler conveyor motor 41 so the loading conveyor is a slave of the cooling conveyor, operating when engaged, at the same speed.

While switch 270 is closed only intermittently in timing sequence by the pallets 32, the clutch 154 is normally continuously engaged and loading conveyor 155 continuously operated by energization of the clutch 154 through normally closed switch 269. Switch 269 is adjustably mounted on the side plate 146 to be opened for a short period by the flight bars 142 of conveyor 155. Motor 281 and chain 153 are designed to drive conveyor 155 at the same speed as conveyor 68, as closely as possible, but no slower than the cooling conveyor. Therefore, if conveyor 155 and flights 142 creep ahead of chain 68 and pallets 32, it is possible that switch 270 may be moved from closed to normally open position during the short interval that switch 269 is also opened. This results in loading conveyor 155 stopping for one loading cycle until the next pallet 32 on the cooling conveyor again closes switch 270 and reenergizes the clutch 154 with the two conveyors 155 and 68 in registry. The cooling cycle time and speed of the cooling conveyor may be varied by the previously described adjustable gear drive 441 and the loader is synchronized to these varied speeds as will be described.

*First pallet unloader*

Figures 8, 11A:
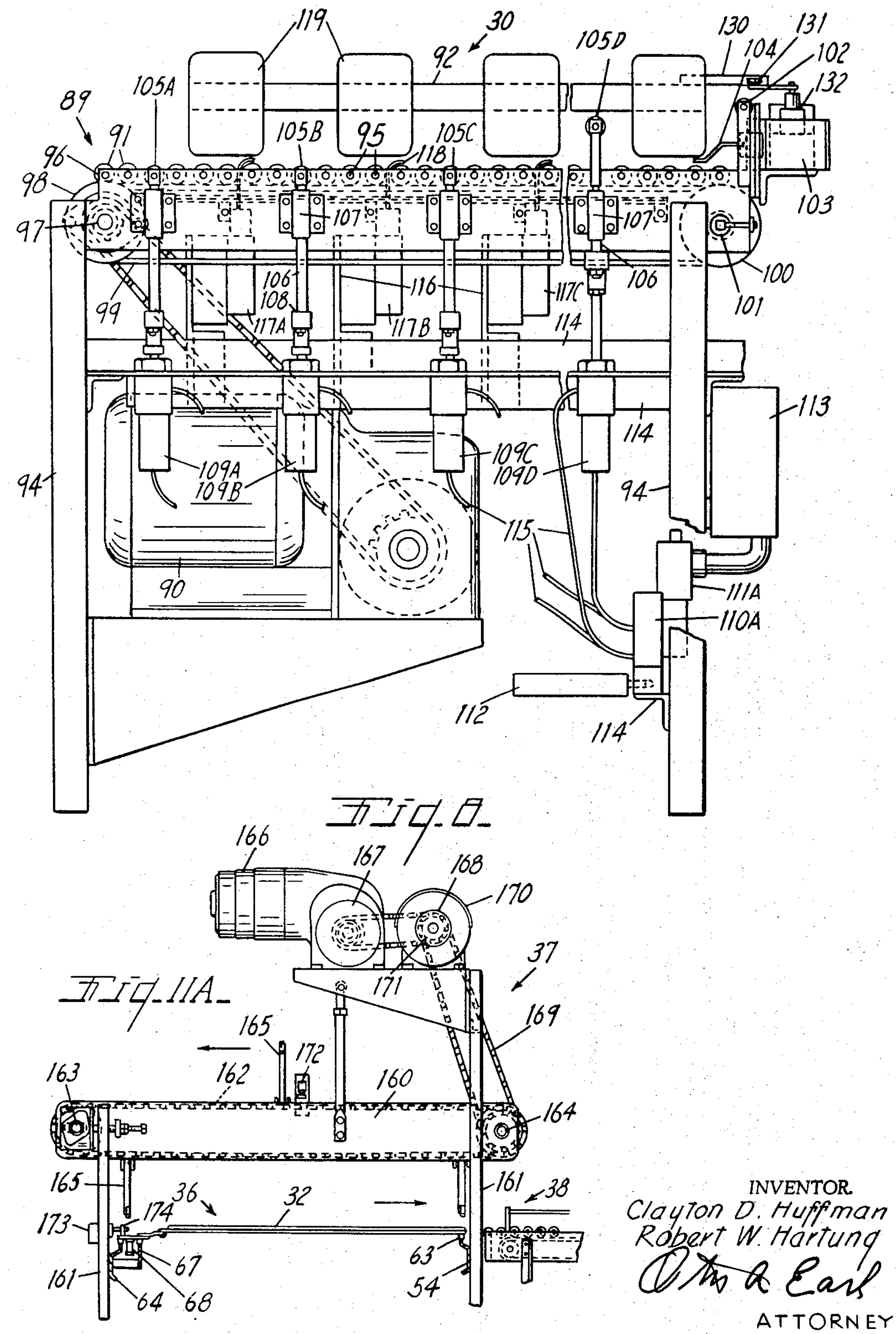
FIG. 8 is a fragmentary vertical cross sectional view taken along the plane of the lines 8—8 in FIGS. 1 and 7 and illustrating the mechanism for positively establishing the spacing between the loaves of fresh bread and for translating the spaced loaves in groups of side by side loaves toward the cooler conveyor loader mechanism.
FIG. 11A is a transverse cross sectional view through the delivery end of the cooling conveyor showing the first of the pallet unloaders in side elevation.
Figures 9, 10:
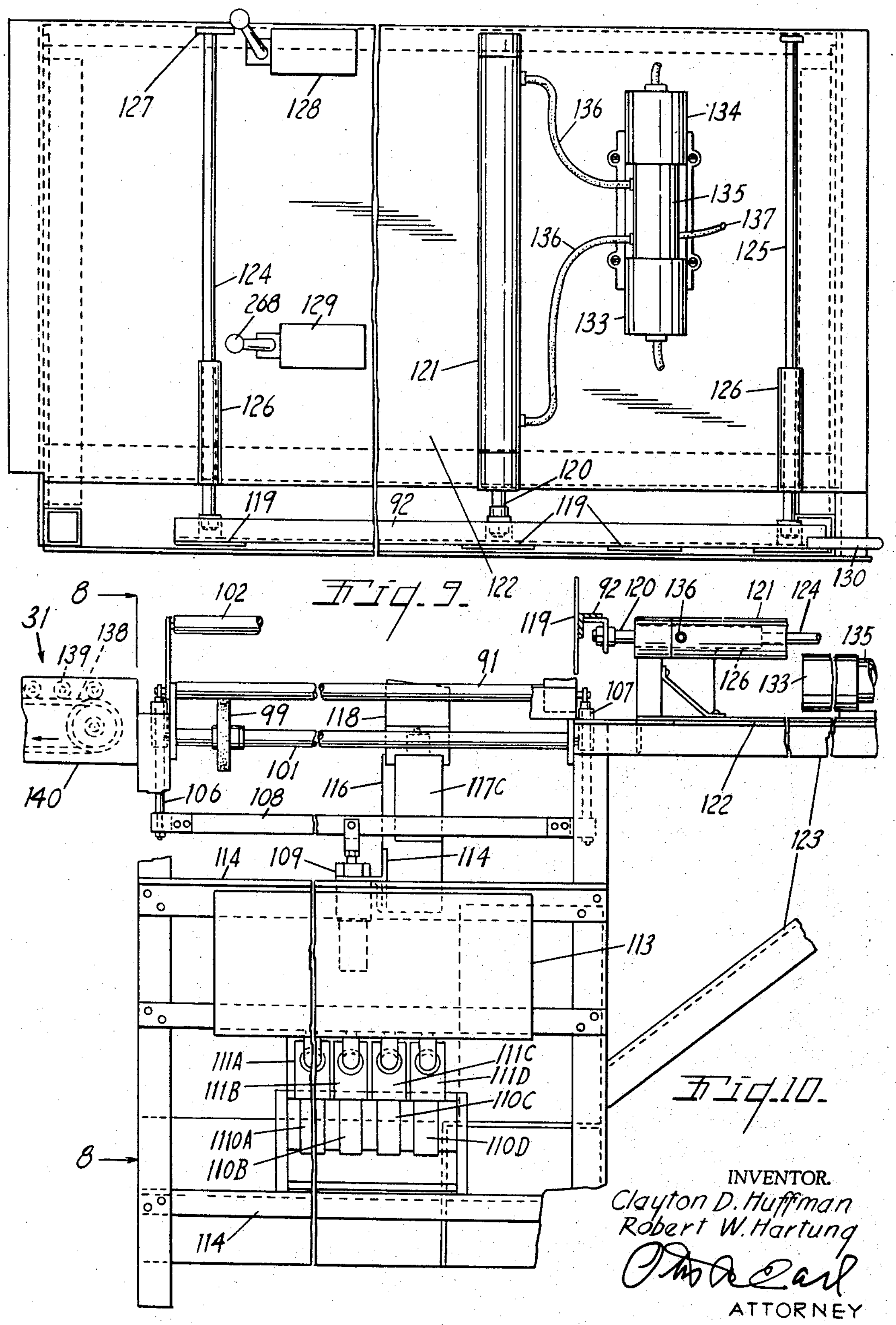
FIG. 9 is a fragmentary top plan view of the bread transfer mechanism shown in FIGS. 7 and 8 illustrating the pneumatic drive connections and some of the controls of the transfer mechanism.
FIG. 10 is a fragmentary side elevational view of the structure shown in FIG. 9 with parts broken away and with part of the receiving conveyor for transferring the group of loaves to the cooling conveyor.

FIGS. 1 and 11A show the first pallet unloader 37. The delivery reach 36 of the cooling conveyor travels along interior rails 64 and 67 with the chain 68 supported therebetween. The exterior ends of the pallets are supported on single rail 63. Slicer feed conveyor 38 terminates or starts closely alongside the outer support bar 54. Spaced cross bars 160 located above the delivery reach on posts 161 support the unloader conveyor chains 162 on shafts 163 and 164. Unloading pusher bars 165 project outwardly from the chains and downwardly toward the pallets 32. A motor 166 and suitable gear box 167 are connected to an electrically actuated clutch-brake 168–170 which is in turn connected to the shaft 164 by chain 169. Since the chains 162 and pusher flights 165 operate quite rapidly, the clutch is desirably provided with an electrically operated brake 170 controlled by the coil 171 (see FIG. 17) to prevent over-run of the pusher flights. A limit or timing switch 172 on one of the cross bars is tripped by a pusher bar as the trailing pusher bar completes its unloading motion to disengage the clutch and apply the brake 170. The clutch is engaged and the brake released by tripping of a switch 173 by a pin 174 on the pallet support links 69 as a pallet is advanced to unloading registry with the conveyor 38. The loaves of bread on the pallet are swept sidewise off the pallet and into transversely extending side by side position on the conveyor 38 which is the desired position for delivery to a slicer.

Selective unloading at plural unloaders may be accomplished by varying the length or position of the switch actuating pins on different pallets to actuate different unloaders; or the switch 173 may be electrically interlocked in series with a manual or automatic switch (not illustrated) that operates according to the demand of the slicer.

Figure 15:
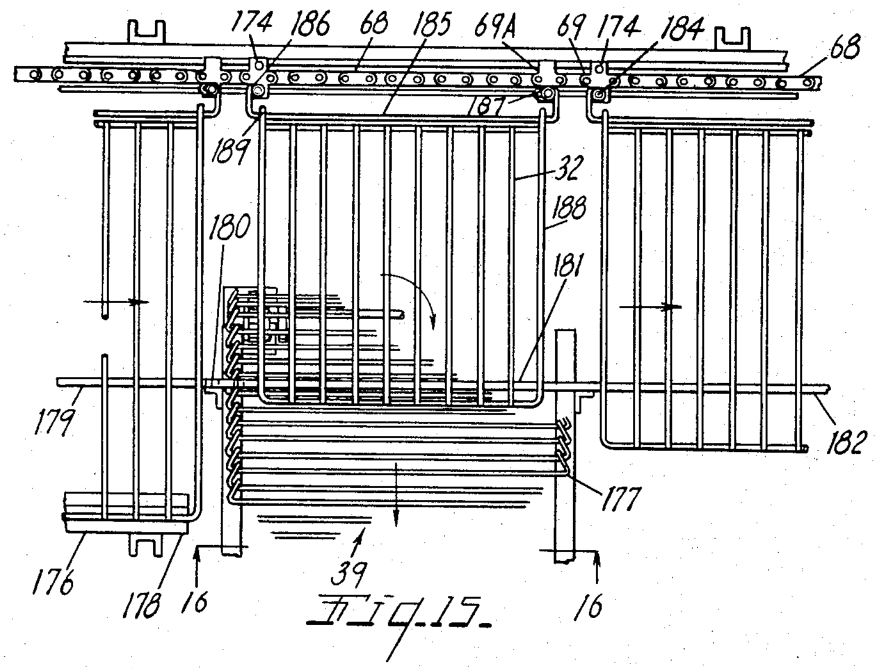
FIG. 15 is a fragmentary plan view of a second form of conveyor unloading arrangement including the first form of pallet connection to the cooling conveyor chain used in FIG. 1.
Figure 16:
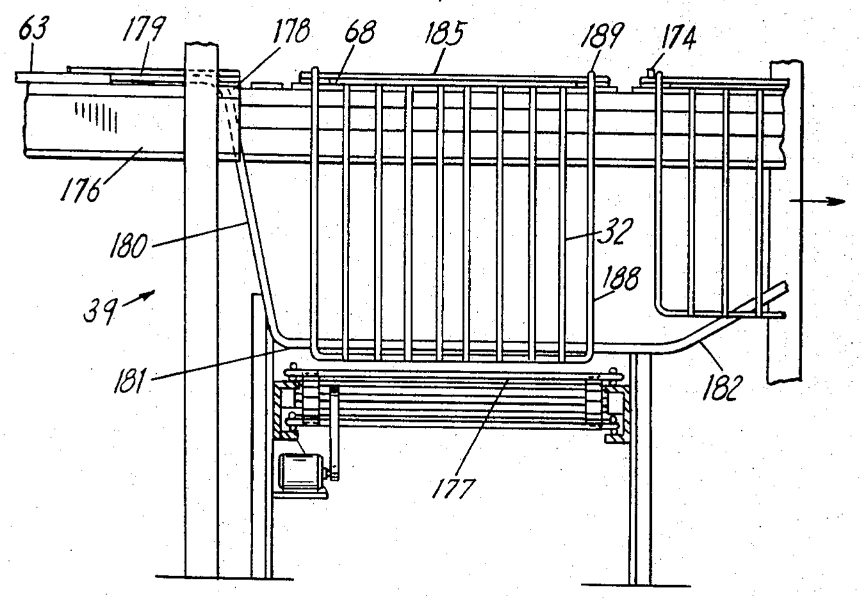
FIG. 16 is a fragmentary vertical cross sectional view taken along the plane of the lines 16—16 in FIGS. 1 and 15 illustrating the modified unloading mechanism in elevation.
Figure 11:
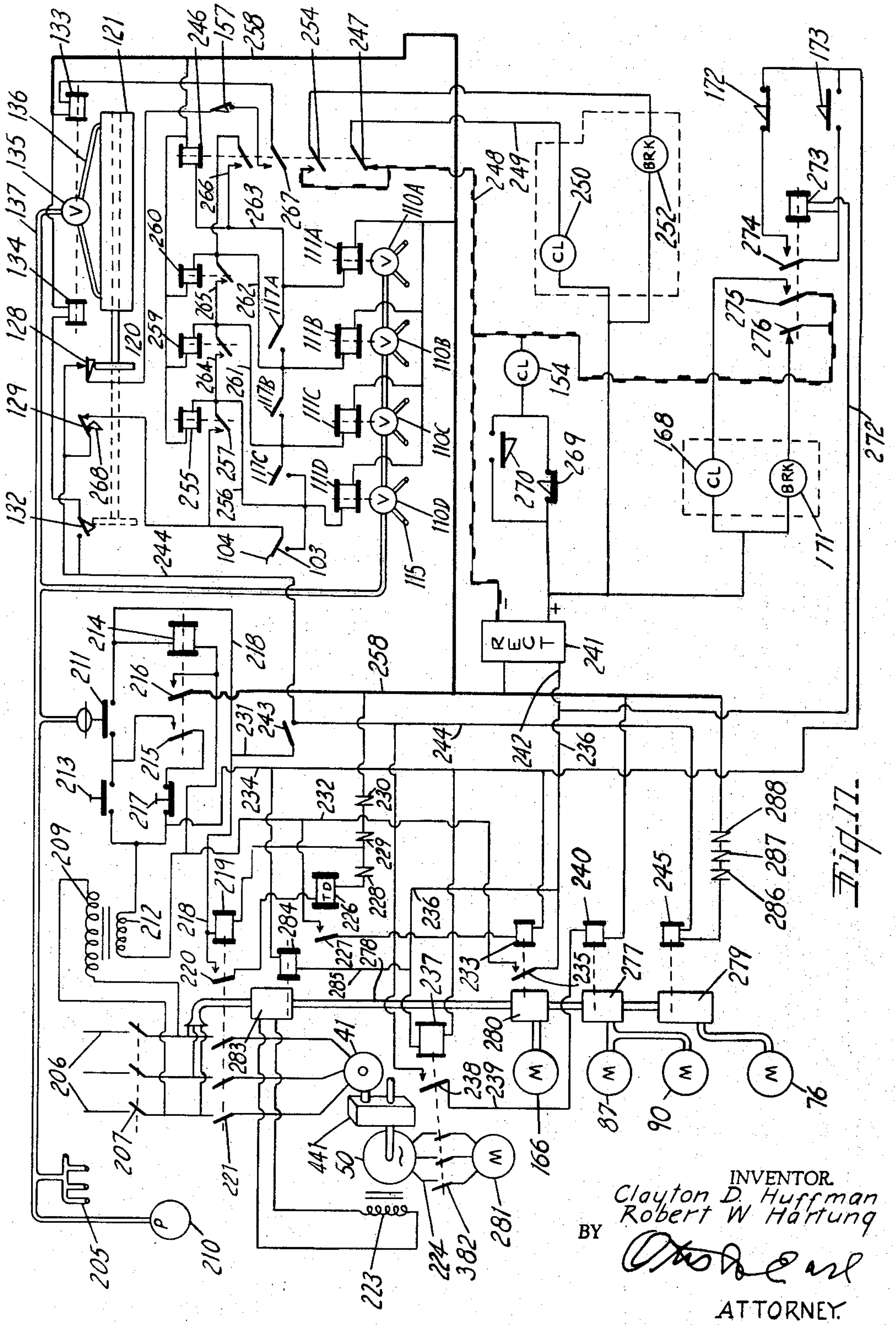

*Second pallet unloader*

Where particularly desired, the pin 174 of selected pallet support links 69 (as for example every second or third pallet) may be omitted or made shorter than the others so as not to trip switch 173 and actuate the first unloader. Bread on these selected pallets will accordingly remain on the pallets and be advanced to the second unloader 39 which is shown in FIGS. 1, 15 and 16. The chain 68 advances the interior ends of the pallets around idler sprocket 175 while the exterior ends are supported on outer rail 176. As the pallets approach the second slicer feed or receiving conveyor 177, the outer rail 176 is terminated as at 178 and support of the pallets is taken over by a rail 179 having a sharp vertical drop at 180 to a horizontal rest 181. The rail then inclines upwardly at 182 to return the outer edges of the pallets to the return rail 183 (see FIG. 1) leading around idler sprocket 40 to the loading conveyor 31.

To permit the pallets 32 to tilt downwardly to the rest 182, spaced pairs of pallet support links 69 and 69A on the chain 68 have ears 183 projecting toward the outer side of the conveyor. These ears carry upright pins 184 to which a pallet support and pivot bar 185 is connected. The bar has a small eye 186 on one end retained over one pin and an elongated eye 187 retained over the pin on link 69A. The elongated eye permits the bar to slide on the link as the chain travels around the curves of the several sprockets 40, 45, 49 and 175. The border strands 188 of the pallets are wrapped in swivel loops 189 around the pivot bars 185 so that the body of each pallet swings down as in FIGS. 15 and 16 to discharge its load of cooled loaves onto the conveyor 177.

Figure 13:
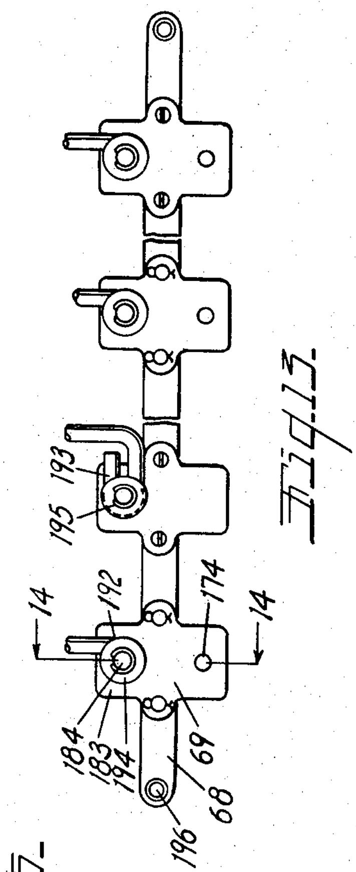
FIG. 13 is an enlarged fragmentary plan view of the conveyor chain of the cooling conveyor and a modified form of the connections thereon for connecting the bread supporting pallets thereto.
Figure 14:
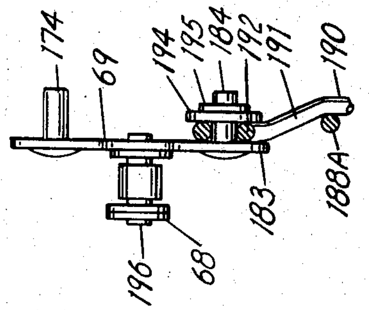
FIG. 14 is a fragmentary cross sectional view taken along the plane of the line 14—14 in FIG. 13 illustrating the connection between the conveyor chain of the cooling conveyor and a modified form of the bread supporting pallets of the conveyor.

*Modified pallet connection*

Where all loaves of cooled bread are to be discharged at one or more of the powered unloaders 37, it is not necessary to provide for vertical tilting of the pallets and a pallet connection as shown in FIGS. 12, 13 and 14 may be used. FIGURE 13 shows the trailing link 69 of one pallet at the left end of the figure, followed by the leading end of the next pallet and its link 69A, motion of the section of the chain shown being to the left as viewed in this figure. The outwardly projecting ears 183 have pins 184 and alternate links 69 at the leading and trailing ends of each pallet carry control or trip pins 174 as before but the border strands 188A are rectangular and the first interior strands or bars 190 are extended inwardly and inclined downwardly at 191 to small circular eyes 192 and elongated eyes 193. The eyes are retained on the pins 184 by washers 194 and snap rings 195. Pallets mounted this way will not tilt as the links 69 and 69A are supported by the spaced slide rails 64 and 67 except when passing around the sprockets and there the chain and links are held against tilting by engagement of the rollers on the pins 196 of the chain with the sprockets. Further, the radially outer ends of the pallets are supported by the rails 73 and 183.

*Cooling conveyor tension control*

As will be seen from the foregoing, the cooling conveyor chain 68 is an extremely long chain passing continuously around the several tiers of each bank of the conveyor as well as the loading and unloading and return reaches of the conveyor. Each tier has a driven sprocket 45 and an idler sprocket 49. The chain engages the driving sprocket for 180° around the sprockets and the same for most of the idler sprockets except where the conveyor makes less than a 180° turn. The driving force for the cooling conveyor is thus well distributed along the conveyor chain. Further, the chain approaches and passes around each drive sprocket 45 in a level position providing a straight even pull on the chain. The slight incline on the return reaches of the several tiers is easily accommodated by flexing of the chain.

In order to keep the conveyor chain taut, all intermediate idler sprockets 49, between the two end idlers 49A (see FIG. 3), are yieldably or slidably supported. Slide plates 197 are mounted on brackets 198 carried by posts 52 and retained for sliding adjustment longitudinally of the tiers by guides 199. (See FIGS. 2, 3A and 4). Stub shafts 200 supporting the sprockets are mounted on the plates. Crossbars 201 supported between interior conveyor support bars 53 and 56 have brackets 202 mounted in opposed relation to the slide plates and pneumatic cylinders 203 connected to the brackets have their piston rods connected to the slide plates at 204. The cylinders 203 are all supplied with the same air pressure through conduits 205.

The plates 197A at the lower infeed end of bank 33 and the upper infeed end of bank 34 are fixedly mounted on their supporting brackets. With this arrangement the chain 68 is held extended and taut. Any localized drag along any tier which may tend to increase the tension in one reach of the chain is yieldably resisted by at least one of the cylinders 203 and the increased pressure created by the affected cylinder is communicated and distributed through all of the conduits 205 so that the increased tension is distributed throughout the chain.

*Circuit diagram and sequence of operation*

FIG. 17 illustrates schematically the electrical drives and controls of the cooling apparatus and portions of the pneumatic controls. A three phase power source is indicated at 206 controlled by a manual breaker switch 207. Closing the switch 207 immediately energizes the primary 209 of a transformer across one phase of the source. A compressor pump 210 usually available in bakeries forms an air pressure source or supply to the conduits 205 to the cooler chain tensioning cylinders 203 as well as to the transfer cylinder 121 and its control valve 135 and the valves 110A to 110D. Pressure in the system also actuates a pressure switch 211 to condition the remainder of the control system for operation.

The secondary coil 212 of the transformer supplies safe low voltage control current. With the air pressure switch 211 closed, the cooler is started by momentarily closing starter switch 213 completing a circuit through relay coil 214 to close holding switch 215 and control switch 216. The cooler is stopped by opening manual stop switch 217 in the holding circuit to deenergize the coil 214. The switches 215 and 211 also energize conductor 218 connected to the cooler motor control coil 219 and switch 220. Return from the coil 219 is through the switch 216 and other switches to be described.

Solenoid coil 219 closes switches 221 on the three phase source energizing the main cooler drive motor 41. The motor 41 is of relatively large power rating, of the order of five horsepower, to drive the long cooling conveyor chain 68 as previously described and is capable of variable speed adjustment by means of the change speed mechanism 441 to vary the length of the cooling cycle. The alternator or generator 50 driven by the main motor has its field 223 energized from one phase of the source and develops a secondary source of voltage at 224 which varies with the speed of the main motor 41.

Closing of switch 220 when the system is turned on supplies control current to time delay solenoid coil 226. Coil 226 while energized holds switch 227 closed and further holds the switch closed for a short-timed delay interval after the coil is deenergized. The return circuit from the delay coil is through overload switches 228, 229 and 230 to conductor 258 and switch 216. Switch 228 is controlled and opened by overload in motor 281 that drives chains 282 and 153 of the loader 31. Switch 229 is controlled and opened by overloading of motor 166 that drives the unloader 37. Switch 230 is controlled by overloading of any motor (not illustrated) that drives any part such as conveyor 38 that receives bread from the cooler. Other overload or safety switches may be added to the series to open the circuit through the time delay coil when a malfunction of some other part makes it desirable to automatically shut off the cooler.

Time delay switch 227 connects conductor 232 from one side of the transformer to relay coil 233 and back through conductor 234 to the opposite side of the transformer. Relay coil 233 when energized closes switch 235 from the same conductor 232 to conductor 236 that extends to a solenoid or relay coil 237 and back to conductor 234. Solenoid 237 when energized closes switch 238 from the transformer via conductors 218, 231, switch 243 and conductor 244 to conductor 239 and solenoid or relay coil 240. A branch of conductor 236 connects to one side of a rectifier 241 at 242 to provide a source of direct current for operating the clutches and brakes of the system. Conductor 231 includes in series a manual switch 243 selectively closable on conductor 244 to the controls of the transfer conveyor. Another branch of conductor 244 extends to relay coil 245. The solenoids or relays 233, 237, 240 and 245 energize motors of the system as will be described presently. The main conveyor motor 41 is turned on as noted by solenoid 219 and switch 221.

Assuming no bread to have reached the transfer conveyor and the pusher piston 120 to be retracted, and further assuming the system to be turned on with time delay coil 226 energized and manual switch 243 closed, control relay coil 246 will be deenergized or deactivated as shown in FIG. 17 and its switch 247 will be closed on conductor 248 providing a D.C. return from conductor 248 and clutch 250. This clutch (which only appears in the schematic circuit) is connected to the plus source of the rectifier 241 to mechanically connect motor 87 to the collecting and spacing conveyor sections 28 and 28A to forward loaves to the rollers 91 of the transfer assembly 30 that are driven continually from motor 90. At the same time, brake 252 associated with the driving connections (also illustrated only in the circuit diagram) will be deenergized by the open condition of switch 254 under the control of coil 246. Loaves of bread will be first collected in side-by-side position on the rollers 405 of collecting conveyor 28 and then accelerated in equally spaced relation by the spacing conveyor section 28A to the rollers 91 of transfer conveyor 89.

As the first loaf reaches stop 102 and actuates limit switch 104, current from conductor 244 and normally closed limit switch 129 is connected to solenoid coil 111D and relay coil 255 through conductor 256. Coil 111D actuates valve 110D to admit air to cylinder 109D and raise stop roller 105D. Coil 255 closes holding switch 257 to hold the coils 255 and 111D energized from switch 129. The return circuit from these coils is through the conductor 258 illustrated by the heavy line to switch 216 and the secondary 212 of transformer. Successive loaves actuate switches 117C, 117B and 117A, progressively actuating valves 110C, and 110B and 110A and also energizing coils 259, 260 and finally coil 246 through conductors 261, 262, and 263, each coil being held energized from switch 129 by its own holding contact 264, 265, and 266 respectively.

Energization of coil 246 has multiple effects. Closing of switch 267 by coil 246 completes a circuit from conductor 244 and limit switch 128 closed in the retracted position of piston rod 120. Timing switch 157 in this circuit is located along a reach of the loading conveyor (see FIG. 11) and is actuated by a flight 142 thereof to indicate that the loading conveyor is in proper registry and ready to receive a group of loaves from the transfer conveyor. If the leading conveyor is not in correct position, switch 157 will delay action of the transfer conveyor pusher until switch 157 is closed. When the circuit is established through switch 157, solenoid 133 is energized moving valve 135 to actuate cylinder 121 to extend piston rod 120 and pushers 119.

Simultaneously switch 247 is opened, deenergizing the direct current circuit to the clutch 250 of the spacing conveyor motor 87. Switch 254 closes establishing a direct current circuit to the brake of the conveyor drive chain 86 and supply of loaves to the transfer conveyor stops. Bread continues to be advanced along the free rotating rollers 81 of the first collecting section 27, and to collect on the rollers 405 at the inlet end of the second section 28 of the conveyor which stopped longitudinal movement with the application of brake 252. The stop period is short as will be noted. Spaced loaves remaining on the high speed spacing belt 83 also stop.

As piston rod 120 and pushers 119 advance or extend pushing a group of loaves off the transfer conveyor rollers 91, limit switch 128 previously held closed by the retracted pushers opens, breaking the circuit to solenoid 133. However, the valve 135 remains in pusher extending position and the pushers advance past one-way tappet 268 on limit switch 129 without opening that switch and continue to the end of the advancing stroke which deposits the loaves on forwarding conveyor rolls 139 that are continually operating from the motor 281. However, the loaves can advance no further than the back of the first flight bar 142 of loading conveyor 143 located over the forwarding conveyor. The out-limit switch 132 is closed energizing solenoid coil 134 to reverse valve 135 and the pusher starts back. Toward the end of its retracting stroke, the pusher strikes the one way pawl 268 this time opening limit switch 129. Limit switch 129 being in the energizing circuit to each of coils 255, 259, 260, 246 and solenoids 11A to D, its opening deenergizes all these coils. Valves 110A to D shift to retract or lower the spacer bars 105A to D. Switch 247 closes and switch 254 opens to engage the clutch and release the brake of the spacer conveyor and collector conveyor drive and the cycle is complete when the tappet 127 on the pusher recloses switch 128. The conveyor sections 28 and 28A thus stop only for the short time required to reciprocate the pusher 92. Conveyor 89 and its rollers 91 desirably rotate continually to quickly advance loaves as soon as the stop bars 105 are lowered.

Switch 157 in the cycle initiating circuit to the coil 133 of the transfer operating valve assures that the pusher 192 will not operate unless the overhead conveyor 143 of the loader 31 is in a position to receive a group of loaves as previously noted.

The overhead conveyor 143 of the loader is controlled, as previously noted, by the switches 269 and 270. Clutch unit 154 is energized to engage the clutch through the normally closed switch 269 except when the switch is opened by engagement of one of the flight bars 142 with the operating bar or tappet 271 of the switch. Normally open switch 270 is positioned to be engaged and closed by the control pin 174 or other part of each approaching empty pallet as the pallet moves to position to receive bread. Switch 270 remains closed only long enough to energize the clutch solenoid 154 to engage the clutch while the flight bar 142 in opening engagement with the switch 269 clears the tappet 271 to permit continued energization of the clutch. In normal operation with a continuous supply of loaves from the pusher 192, the switch 270 closes as switch 269 opens so conveyor 143 operates continuously to load each successive flight 32. If the system gets out of time and switch 270 is closed and then opened by a flight pin before switch 269 is closed, the conveyor makes only a partial small movement that is not sufficient to load the leading group of loaves or to permit closing of switch 269. One pallet passes by the loading position empty. Usually the pin of the next pallet activates switch 270 and the clutch 154 sufficiently to permit switch 269 to be closed to complete a loading cycle. The switch 157 is positioned to be opened at about the time that switch 269 is opened so that the pusher 192 cannot push a second group of loaves into a preceding group delayed by unsynchronized operation of switches 269 and 270.

The loaves, loaded in accurately and economically spaced relation, on the pallets are carried by the pallets, without movement relative to the pallets, through the banks of the cooling conveyor to the unloaders. The absence of movement of the loaves relative to the pallets prevents undesired crumbling or crumbing of the bread when it is in its softest and warmest and most fragile condition.

As the pallets approach the unloader 37 after the bread is cooled, the pins 174 on the chain 68 associated with each pallet (or each pallet predetermined for unloading at the powered unloader) strikes the operating element of switch 173. This completes a circuit from conductor 236 through conductor 272 to solenoid coil or relay 273 to return conductor 234. Switch 274 operated by the relay closes a holding circuit through normally closed switch 172 and also closes switch 275 completing a direct current energizing circuit through the electric clutch 168 to activate the unloading conveyor 162. At the same time, switch 276 is opened deenergizing coil 171 and releasing the brake 170 and the unloader operates to sweep a group of loaves off the pallet. After the pallet is unloaded the flight or pusher 165 of the unloader strikes switch 172 opening the holding circuit to coil or relay 273 and reversing the positions of switches 275 and 276 to stop the unloading conveyor until another pallet with a pin positioned to actuate switch 173 arrives at the unloader.

The motors 87 and 90 that drive the collecting and spacing conveyor sections 28 and 28A and the transfer conveyor 89 are energized by a switch 277 closed by energizing solenoid 240. The switch makes connection with the three phase source through wires conventionally shown in a conduit 278. Solenoid 245 actuates a switch 279 to connect supply conveyor motor 76 to the source. Solenoid 233 actuates switch 280 to connect motor 166 of the unloader to the source. The loader 31 is driven by a motor 281 energized by the switch 382 from the alternator 50 and under the control of the solenoid 237. It will be noted that time delay solenoid 226 and switch 227 control the solenoids 233, 237 and 240 and through them the unloader motor 166, spacer motor 87, transfer motor 90 and the loader motor 281. The long cooler conveyor and the load thereon coasts a little after the main drive motor 41 is shut down. If the solenoid 219 is deenergized by unintentional and unexpected opening of one of the safety switches 228, 229 and 230, the delayed opening of switch 227 delays deenergization of motors 166, 87, 90 and 281 and permits the loader 31, spacer conveyor, transfer motor 90 and unloader 37 to continue to operate for a few seconds so that there will be no bread or group of loaves left partway onto the transfer conveyors 30, 89, or on the rolls 139 of the loading conveyor 31, or at the ends of the overhead loading conveyor 143 either leading into the cooler or at its discharge end by the unloader 37. The connections of the conductors 232 and 234 to opposite sides of the transformer secondary 212 maintain control voltage to the rectifier 241 and control conductor 272 to the unloader clutch and brake controls of the conveyors 28, 89, 143 and 162. If switch 243 is closed, control current is also present in conductor 244 to the spacing controls and pusher control valve 135 so the transfer assembly 30 and loader 31 will not stop in the middle of a cycle even though the cooler drive motor 41 is deenergized by opening of either overload switch 229 or 230.

The exciter 223 of the alternator 50 which supplies the loader motor 281 remains energized through switch 383 held closed by a solenoid or relay coil 284. The coil 284 is energized from conductors 232–236 by conductor 285 to conductor 234 so long as time delay solenoid switch 227 remains closed to close switch 235. However, since by assumption, motor 41 has been deenergized and is coasting to a stop along with cooling conveyor chain 68, the speed of alternator 50 and its output voltage decreases. As a result, the speed of loader motor 281 decreases at the same rate and the speed of loader conveyor 143 remains synchronized with the speed of the pallets as they slow to a stop.

Opening of manual switch 243 disconnects conductor 244 from the transformer so that the electrical control elements that actuate the pusher of the transfer 30, the spacing conveyor 28, transfer conveyor 89 and loader 143 are deactivated. Motors 76, 87, 90 and 281 are deenergized and the loading operation ceases while the cooler motor 41 and unloader motor 166 and controls continue to function to empty the load from the cooler.

The infeeding drive of motor 76 may be stopped automatically by opening of its own overload safety switch 286 or overload switches 287 or 288 of motors 87 or 90. The cooler continues to operate but is not loaded due to the absence of bread to actuate the limit and control switches of the transfer mechanisms 31.

What is claimed as new is:

1. A conveyor construction, particularly for cooling loaves of bread, comprising:
   - an endless chain movable through a path having at least one horizontally elongated, vertically spiralled reach located between a loading reach and an unloading reach;
   - a plurality of pallets connected along corresponding inner side edges thereof to said chain and projecting outwardly from said chain so that said pallets are moved in succession through said path, said pallets each having a rigid, foraminous, generally planar, horizontal upper surface onto which objects can be slid in precisely spaced side-by-side relation so that the objects are exposed to the ambient air on all sides thereof, said pallets being substantially horizontally arranged in said loading reach of said path;
   - a loading conveyor having a substantially horizontal object-supporting surface of at least substantially the same width as said pallets and extending away from said loading reach at substantially the same vertical level, and horizontally movable pushers for engaging groups of objects on the loading conveyor and sliding same onto said pallets;
   - exterior rail means extending in spaced relation to said interior rail means for movably supporting said pallets at positions spaced outwardly from said inner side edges thereof; and driving and idler sprockets for moving and guiding said chain in the spiralled reach.

2. A conveyor construction according to claim 1, including means for feeding groups of objects in precisely spaced side-by-side relation to said loading conveyor and means on said loading conveyor for maintaining the objects in each group in precisely spaced side-by-side relation and in lateral alignment with each other.

3. A conveyor construction according to claim 2, in which said upper surfaces of said pallets are substantially horizontally arranged in said unloading reach, a forwarding conveyor extending sidewardly from said unloading reach and having a horizontal object-supporting surface disposed at substantially the same vertical level as said upper surfaces of said pallets in said unloading reach, pusher means and mounting means supporting said pusher means above said unloading reach for horizontal movement in a direction crosswise of said unloading reach for moving a group of objects on a pallet at said unloading reach onto said forwarding conveyor.

4. A conveyor construction, particularly for cooling loaves of bread, comprising:

an endless chain movable through a path having at least one horizontally elongated, vertically spiralled reach located between a loading reach and an unloading reach;

a plurality of pallets each of which is connected along corresponding inner side edges thereof to said chain by two spaced-apart links, each link having an upstanding pin thereon, each of said pallets having a first small eye encircling the pin on one link and having a second eye whose opening is elongated in the direction of the chain, the second eye encircling the pin on the other link, and means releasably retaining said eyes on said pins, said pallets projecting outwardly from said chain so that said pallets are moved in succession through said path, said pallets each having a rigid, foraminous, generally planar, horizontal upper surface onto which objects can be slid in precisely spaced side-by-side relation so that the objects are exposed to the ambient atmosphere on all sides thereof;

exterior rail means extending in spaced relation to said interior rail means for movably supporting said pallets at positions spaced outwardly from said inner side edges thereof; and driving and idler sprockets for moving and guiding said chain in the spiralled reach.

5. A conveyor system according to claim 4, in which said eyes are provided on a pivot bar, the remainder of said pallet being pivotally mounted on said pivot bar.

6. A conveyor system according to claim 4, in which said interior rail means comprises a pair of horizontally spaced parallel rails, said chain being located between said rails and said links slidably engaging said rails and bridging the space therebetween.

References Cited

UNITED STATES PATENTS

| | | | |
|---|---|---|---|
| 2,576,107 | 11/1951 | Davis | 198—158 |
| 2,623,630 | 12/1952 | Erickson | 198—208 |
| 2,649,100 | 8/1953 | Frech | 198—181 X |
| 3,163,283 | 12/1964 | Kuwertz | 198—38 |

FOREIGN PATENTS

| | | |
|---|---|---|
| 67,528 | 8/1948 | Denmark. |
| 917,625 | 2/1963 | Great Britain. |

EDWARD A. SROKA, *Primary Examiner.*

EVON C. BLUNK, *Examiner.*